United States Patent

[11] 3,624,751

[72] Inventor Ronald F. Dettling
China Lake, Calif.
[21] Appl. No. 31,099
[22] Filed Apr. 23, 1970
[45] Patented Nov. 30, 1971
[73] Assignee The United States of America as represented by the Secretary of the Navy

[54] AERODYNAMIC AIR INLET FOR AIR-BREATHING PROPULSION SYSTEMS
4 Claims, 2 Drawing Figs.

[52] U.S. Cl.................................................. 137/81.5,
137/15.1, 244/53.8
[51] Int. Cl...................................................... F15d 1/10
[50] Field of Search........................................... 137/81.5,
15.1, 15.2; 244/53.8, 130

[56] References Cited
UNITED STATES PATENTS
2,864,236 12/1958 Toure et al.................. 137/15.1
3,086,357 4/1963 Rubin et al.................. 137/15.2
2,721,715 10/1955 Hoadley...................... 137/15.1
3,524,458 8/1970 Goldsmith................... 137/15.1

*Primary Examiner*—William R. Cline
*Attorneys*—R. S. Sciascia, Roy Miller and Gerald F. Baker ABSTRACT: Means for effecting the induction of outside air into the combustion process of an air-breathing propulsion system such as ram jets, ducted rockets, and air-augmented rockets. A jet of fluid is exhausted at high velocity into the airstream just behind an open port in the skin of the vehicle. The injection of this fluid causes the formation of a shock wave some distance upstream of the point of injection. Air between this shock wave and the injection point is at a high pressure and thus flows into the open port in the skin of the vehicle. Thus, no external obstruction need be attached to the vehicle to divert air into the port.

FLOW FIELD WITH JET ON

PATENTED NOV 30 1971    3,624,751

FLOW FIELD WITH JET OFF

FLOW FIELD WITH JET ON

INVENTOR.
RONALD F. DETTLING
BY    ROY MILLER
ATTORNEY

GERALD F. BAKER
AGENT

AERODYNAMIC AIR INLET FOR AIR-BREATHING PROPULSION SYSTEMS

BACKGROUND OF THE INVENTION

Air-breathing propulsion systems have heretofore required that a physical scoop or other external obstruction be placed outside the body of the vehicle in the moving airstream so as to force a portion of the flowing air to be diverted to the interior of the propulsion unit where it may be mixed with a fuel and burned to yield propulsive power. Because this air must be slowed and turned by a physical obstruction attached to the vehicle a drag force opposite to the vehicle motion is produced, requiring that the propulsion unit deliver additional energy in order to overcome this force. Such scoops or ducts also increased the overall envelope of the vehicle adding to the aerodynamic problems involving the shape and maneuverability of the vehicle.

According to the present invention, no external physical obstruction is used to induct the air. Instead, a jet of fluid is exhausted at high velocity into the airstream just behind an open port in the skin of the vehicle. The injection of this fluid causes the formation of a shock wave some distance upstream of the point of injection. A high-pressure area is thus created between the shock wave and the injection point to cause air to flow into the open port in the skin of the vehicle.

Various types of fluids, ranging from cold air to fluids which combust with the outside air, may be used to form the shock wave and the high-pressure area from which air is inducted.

DETAILED DESCRIPTION OF THE INVENTION

Figure 1:
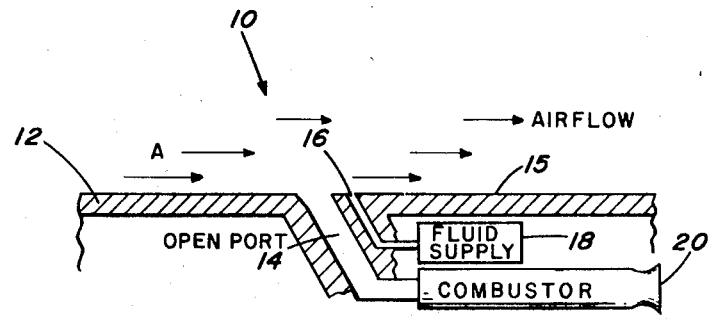
FIG. 1 is a diagrammatic view of a section of the skin of a vehicle embodying the invention.

As shown in FIG. 1, a vehicle 10 has a skin 12 formed with an open port intake passageway 14 leading to a combustor 20 which supplies motive power to the vehicle. During flight of the vehicle, air A flows in the direction of the arrows past the port 14. A second port 16 is provided in skin 12 of the vehicle leading to a fluid supply 18. Fluid may be expelled in a controlled manner by any known means. In the arrangement shown, it may be seen that there are no external obstructions jutting out from the surface 15 of skin 12.

Figure 2:
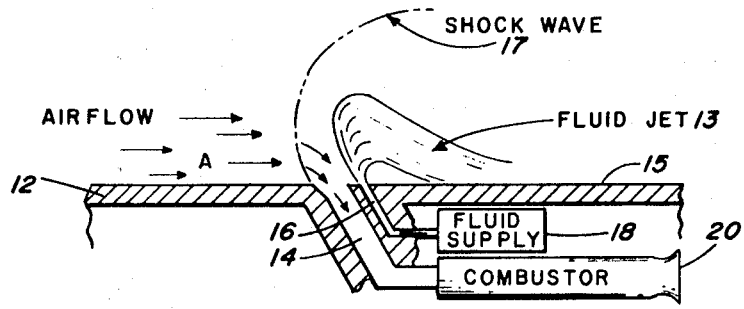
FIG. 2 is a view similar to FIG. 1 with changed conditions of fluid flow.

Looking now at FIG. 2, as fluid is supplied from port 16, a fluid jet 13 is formed jutting out from the surface 15 of a skin 12. Ejection of the fluid jet 13 causes, with the airflow A, a shock wave 17 which precedes the frontal portion of the fluid jet and pressure buildup forces a portion of the air to flow into port 14 for use of combustor 20.

As stated above, various types of fluids may be used to form the shock wave to cause induction of air. A very strong shock wave with high-pressure area for very little mass of fluid can be had for example with fluids such as triethylaluminum or pentaborane which combust readily with the outside air. In some instances, it might be considered necessary or desirable to augment the effect by including a small extensible and retractable flap but some reduction in efficiency must be expected because of the air drag produced by such flap.

In the preferred embodiment, however, no external physical obstruction is used. Thus, the air drag on a physical obstruction is eliminated and the propulsion system need not produce additional energy to overcome this drag, resulting in an increase in propulsive efficiency. Also, by a variation in the amount and velocity of fluid exhausting from the shock producing jet, a variation in the amount of air inducted into the open port is obtained, allowing efficient operation of the propulsion system over a wide range of speeds and altitudes where the amount of inducted air must be controlled for maximum efficiency. Finally, elimination of external scoops or ducts significantly decreases the overall envelope of the vehicle, allowing it to be handled more easily and with less possibility of damage to critical parts of the propulsion system.

While the invention has been described in relation to a vehicle using air for a motive power combustor, it will be appreciated by workers in other fields that the arrangement shown may be utilized in many other applications involving the flow of air along a surface and the desirability of ingesting a portion of the air into a port in the surface.

What is claimed is:

1. Means for ingesting air angularly into an elongated airframe body having relative motion with an air mass comprising:
   an intake passageway with said body communicating with said air mass and at an oblique angle near normal to the airflow around said body;
   means including a second passageway for establishing a jet of fluid, spaced from said passageway rearwardly along the direction of relative motion; such that, when a jet of fluid is so established, physical interaction of said fluid and said air mass causes air to be forced to enter said intake passageway.

2. Apparatus according to claim 1 wherein said fluid is highly reactive with air thus increasing said physical interaction.

3. Apparatus according to claim 2 wherein said fluid is a liquid selected from the group consisting of; triethylaluminum and pentaborane.

4. Apparatus according to claim 1 wherein said fluid is a liquid selected from the group consisting of; triethylaluminum and pentaborane.

* * * * *